(12) United States Patent
Schennum et al.

(10) Patent No.: US 11,547,152 B2
(45) Date of Patent: Jan. 10, 2023

(54) RE-CHARGING PACK FOR AN E-CIGARETTE

(71) Applicant: Nicoventures Holdings Limited, London (GB)

(72) Inventors: Steven Michael Schennum, London (GB); Thomas Michael McKeon, London (GB); Matthew Joel Nettenstrom, London (GB); Justin Banker Peart, London (GB)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 16/564,500

(22) Filed: Sep. 9, 2019

(65) Prior Publication Data

US 2020/0000142 A1 Jan. 2, 2020

Related U.S. Application Data

(63) Continuation of application No. 15/301,105, filed as application No. PCT/GB2015/050956 on Mar. 30, 2015, now Pat. No. 10,412,994.

(30) Foreign Application Priority Data

Mar. 31, 2014 (GB) ...................................... 1405721

(51) Int. Cl.
*A24F 13/00* (2006.01)
*A24F 17/00* (2006.01)
(Continued)

(52) U.S. Cl.
CPC ............ *A24F 40/95* (2020.01); *H02J 7/0042* (2013.01)

(58) Field of Classification Search
CPC ...... H01R 47/008; H02J 7/0042; H02J 7/0047
(Continued)

(56) References Cited

U.S. PATENT DOCUMENTS

| D53,386 S | 5/1919 | Thomas |
|---|---|---|
| 2,522,952 A | 9/1950 | Krohn |

(Continued)

FOREIGN PATENT DOCUMENTS

| CA | 2859610 A1 | 6/2013 |
|---|---|---|
| CA | 2 862 045 A1 | 7/2013 |

(Continued)

OTHER PUBLICATIONS

Chinese Office Action, Application No. 201580040920.9, dated Aug. 28, 2018, 5 pages (10 pages with translation).

(Continued)

*Primary Examiner* — Abdullah A Riyami
*Assistant Examiner* — Thang H Nguyen
(74) *Attorney, Agent, or Firm* — Patterson Thuente, P.A.

(57) ABSTRACT

Various embodiments provide a pack for holding and re-charging an e-cigarette. The pack comprises a pack battery; a body portion including a tube for receiving an e-cigarette; a re-charging mechanism for re-charging the e-cigarette received into the tube using the pack battery; and a lid attached to the body portion. The lid can be opened to allow the e-cigarette to be received into the tube, and closed to retain the e-cigarette in the tube. The pack is configured to transition from a higher power state to a lower power state a predetermined period of time after the lid is opened and before the lid has been shut.

18 Claims, 7 Drawing Sheets

(51) Int. Cl.
*A24F 25/00* (2006.01)
*A24F 40/95* (2020.01)
*H02J 7/00* (2006.01)

(58) Field of Classification Search
USPC .......................................................... 131/328
See application file for complete search history.

(56) References Cited

U.S. PATENT DOCUMENTS

| | | | |
|---|---|---|---|
| 3,583,625 A | 6/1971 | Gero | |
| 3,655,325 A | 4/1972 | Toppel | |
| 3,749,234 A | 7/1973 | Gero | |
| 3,886,953 A | 6/1975 | Pope | |
| 3,963,033 A | 6/1976 | Pope | |
| 4,214,658 A | 7/1980 | Crow | |
| D279,508 S | 7/1985 | Bauer et al. | |
| 4,776,353 A | 10/1988 | Lilja et al. | |
| 4,848,376 A | 7/1989 | Lilja et al. | |
| 4,850,006 A | 7/1989 | Sasaki et al. | |
| 4,907,606 A | 3/1990 | Lilja et al. | |
| 4,947,874 A | 8/1990 | Brooks | |
| 5,044,550 A | 9/1991 | Lamm | |
| D322,687 S | 12/1991 | Tschudin | |
| D346,878 S | 5/1994 | Gee et al. | |
| 5,530,225 A | 6/1996 | Hajaligol | |
| 5,558,429 A | 9/1996 | Cain | |
| 5,612,732 A | 3/1997 | Yuyama et al. | |
| 5,649,554 A | 7/1997 | Spinkel | |
| D392,069 S | 3/1998 | Rowland | |
| 5,865,185 A | 2/1999 | Collins | |
| 5,878,752 A | 3/1999 | Adams et al. | |
| 5,934,289 A | 8/1999 | Watkins et al. | |
| D414,892 S | 10/1999 | Chen | |
| 5,967,310 A | 10/1999 | Hill | |
| 6,012,459 A | 1/2000 | Keefe | |
| D436,725 S | 1/2001 | Rogers | |
| D441,133 S | 4/2001 | Emery | |
| D449,521 S | 10/2001 | Pinkus et al. | |
| 6,446,793 B1 | 9/2002 | Layshock | |
| 6,530,495 B1 | 3/2003 | Joseph | |
| 6,637,430 B1* | 10/2003 | Voges | A61M 15/0065 141/2 |
| 6,803,550 B2 | 10/2004 | Sharpe | |
| 7,293,565 B2 | 11/2007 | Griffin | |
| D566,329 S | 4/2008 | Bagaric et al. | |
| D566,890 S | 4/2008 | Bagaric | |
| 7,409,955 B2* | 8/2008 | Mauldin | A24F 13/24 131/248 |
| 7,455,176 B2 | 11/2008 | Focke | |
| D631,838 S | 2/2011 | Cheng | |
| D650,738 S | 2/2011 | Leung | |
| 7,896,002 B2 | 3/2011 | Watanabe | |
| 8,156,944 B2 | 4/2012 | Li | |
| 8,314,591 B2 | 11/2012 | Terry et al. | |
| 8,448,783 B2 | 5/2013 | Veechi | |
| D690,461 S | 9/2013 | Chen | |
| D693,055 S | 11/2013 | Manca et al. | |
| D700,397 S | 2/2014 | Manca et al. | |
| 8,684,172 B2 | 4/2014 | Yao | |
| 8,689,804 B2 | 4/2014 | Fernando | |
| 8,781,307 B2 | 7/2014 | Buzzetti | |
| 8,794,245 B1 | 8/2014 | Scatterday | |
| 8,794,434 B2 | 8/2014 | Scatterday et al. | |
| D715,760 S | 10/2014 | Kim | |
| D716,267 S | 10/2014 | Kim | |
| D720,884 S | 1/2015 | Liu | |
| D723,738 S | 3/2015 | Liu | |
| 8,975,764 B1 | 3/2015 | Abehasera | |
| 8,978,663 B2 | 3/2015 | Newton | |
| D736,460 S | 8/2015 | McKeon et al. | |
| D737,507 S | 8/2015 | Liu | |
| 9,302,825 B2 | 4/2016 | Liu | |
| 9,499,332 B2 | 11/2016 | Fernando | |
| 9,603,388 B2 | 3/2017 | Fernando | |
| 10,130,119 B2* | 11/2018 | Murison | H04W 4/008 |
| 10,218,193 B2 | 2/2019 | Gratton | |
| 10,750,779 B2 | 8/2020 | Schennum et al. | |
| 2002/0005207 A1 | 1/2002 | Wrenn | |
| 2003/0063523 A1 | 4/2003 | Mulaw | |
| 2006/0196518 A1 | 9/2006 | Hon | |
| 2007/0074734 A1 | 4/2007 | Braunshteyn | |
| 2008/0121244 A1 | 5/2008 | Bryman | |
| 2009/0051326 A1 | 2/2009 | Wang et al. | |
| 2009/0096430 A1 | 4/2009 | Van Der Linde et al. | |
| 2009/0283103 A1 | 11/2009 | Nielsen | |
| 2010/0126505 A1 | 5/2010 | Rinker | |
| 2010/0307518 A1 | 12/2010 | Yi | |
| 2010/0313901 A1 | 12/2010 | Fernando et al. | |
| 2011/0162663 A1 | 7/2011 | Bryman | |
| 2011/0180433 A1 | 7/2011 | Rennecamp | |
| 2011/0203600 A1* | 8/2011 | Bardelli | A24F 15/18 131/250 |
| 2011/0226266 A1 | 9/2011 | Tao | |
| 2011/0265806 A1* | 11/2011 | Alarcon | A24F 40/95 131/273 |
| 2011/0277780 A1* | 11/2011 | Terry | A61M 15/06 131/273 |
| 2012/0160251 A1 | 6/2012 | Hammel et al. | |
| 2012/0211014 A1* | 8/2012 | Bardelli | A24F 23/00 131/250 |
| 2012/0227753 A1 | 9/2012 | Newton | |
| 2012/0255567 A1 | 10/2012 | Rose | |
| 2013/0037042 A1* | 2/2013 | Hearn | A61M 15/06 141/18 |
| 2013/0098786 A1 | 4/2013 | Collins | |
| 2013/0298922 A1 | 11/2013 | Xiang | |
| 2013/0300350 A1 | 11/2013 | Zhiyong | |
| 2013/0314055 A1 | 11/2013 | Van et al. | |
| 2013/0333711 A1 | 12/2013 | Liu | |
| 2013/0340778 A1 | 12/2013 | Liu | |
| 2013/0341218 A1 | 12/2013 | Liu | |
| 2013/0342157 A1 | 12/2013 | Liu | |
| 2014/0007892 A1 | 1/2014 | Liu | |
| 2014/0014124 A1 | 1/2014 | Glasberg | |
| 2014/0014125 A1* | 1/2014 | Fernando | A24F 40/50 131/328 |
| 2014/0020697 A1* | 1/2014 | Liu | A24F 40/40 320/108 |
| 2014/0053858 A1 | 2/2014 | Liu | |
| 2014/0083443 A1 | 3/2014 | Liu | |
| 2014/0096782 A1 | 4/2014 | Ampolini | |
| 2014/0097103 A1 | 4/2014 | Cameron | |
| 2014/0107815 A1* | 4/2014 | LaMothe | A24F 15/01 700/90 |
| 2014/0123990 A1 | 5/2014 | Timmermans | |
| 2014/0196731 A1 | 7/2014 | Scatterday | |
| 2014/0196736 A1 | 7/2014 | Fernando et al. | |
| 2014/0286002 A1 | 9/2014 | Liu | |
| 2014/0348495 A1 | 11/2014 | Greim | |
| 2015/0015186 A1 | 1/2015 | Xiang | |
| 2015/0020831 A1 | 1/2015 | Weigensberg | |
| 2015/0020832 A1 | 1/2015 | Greim et al. | |
| 2015/0059785 A1 | 3/2015 | Liu | |
| 2015/0114410 A1* | 4/2015 | Doster | A24F 40/40 131/329 |
| 2015/0128971 A1 | 5/2015 | Verleur et al. | |
| 2015/0128975 A1 | 5/2015 | Alarcon | |
| 2015/0173419 A1 | 6/2015 | Tu | |
| 2015/0201676 A1 | 7/2015 | Shin | |
| 2015/0245654 A1 | 9/2015 | Memari | |
| 2015/0245668 A1* | 9/2015 | Memari | A24F 40/60 206/250 |
| 2015/0296885 A1 | 10/2015 | Liu | |
| 2015/0333542 A1 | 11/2015 | Alarcon | |
| 2015/0333552 A1 | 11/2015 | Alarcon | |
| 2015/0333561 A1* | 11/2015 | Alarcon | H02J 7/0042 131/329 |
| 2016/0226286 A1 | 8/2016 | Zhiyong | |
| 2016/0250201 A1 | 9/2016 | Rose | |
| 2016/0278436 A1* | 9/2016 | Verleur | H02J 7/0045 |
| 2016/0374390 A1 | 12/2016 | Liu | |
| 2017/0027221 A1* | 2/2017 | Liu | H02J 7/0044 |

(56) References Cited

U.S. PATENT DOCUMENTS

| | | | |
|---|---|---|---|
| 2017/0086502 A1* | 3/2017 | Hearn | A24F 40/485 |
| 2017/0114965 A1* | 4/2017 | Maglica | H02J 7/0045 |
| 2017/0207499 A1 | 7/2017 | Leadley | |
| 2017/0208865 A1 | 7/2017 | Nettenstrom | |
| 2017/0222468 A1 | 8/2017 | Schennum et al. | |
| 2018/0199618 A1 | 7/2018 | Fuisz | |
| 2019/0157887 A1 | 5/2019 | Gratton | |
| 2019/0190088 A1 | 6/2019 | Leadley | |
| 2020/0127478 A1 | 4/2020 | Gratton | |

FOREIGN PATENT DOCUMENTS

| | | |
|---|---|---|
| CA | 2862045 | 7/2013 |
| CN | 201290340 | 8/2009 |
| CN | 201299102 Y | 9/2009 |
| CN | 201341434 | 11/2009 |
| CN | 201571500 U | 9/2010 |
| CN | 101869356 A | 10/2010 |
| CN | 201384062 Y | 10/2010 |
| CN | 201813848 | 5/2011 |
| CN | 201928066 U | 8/2011 |
| CN | 202122096 U | 1/2012 |
| CN | 202679020 | 1/2013 |
| CN | 102970885 A | 3/2013 |
| CN | 203416029 U | 1/2014 |
| CN | 203481880 U | 3/2014 |
| CN | 203481882 U | 3/2014 |
| CN | 203491727 U | 3/2014 |
| CN | 203491758 U | 3/2014 |
| CN | 203504217 U | 3/2014 |
| CN | 203504250 U | 3/2014 |
| CN | 203537022 U | 4/2014 |
| CN | 203554013 U | 4/2014 |
| CN | 103798960 A | 5/2014 |
| CN | 203633510 U | 6/2014 |
| CN | 203633514 U | 6/2014 |
| CN | 203662028 | 6/2014 |
| CN | 203689071 U | 7/2014 |
| EP | 2253233 A1 | 11/2010 |
| EP | 2157873 B1 | 7/2011 |
| EP | 2573900 A1 | 3/2013 |
| EP | 2668858 A1 | 12/2013 |
| EP | 3171720 A1 | 5/2017 |
| GB | 1046183 | 7/1988 |
| GB | 2068034 | 11/1997 |
| GB | 4000273 | 12/2006 |
| GB | 4006615 | 10/2008 |
| GB | 2514893 A | 12/2014 |
| KR | 200448273 Y1 | 3/2010 |
| KR | 20110003475 U | 4/2011 |
| KZ | 27104 B | 6/2013 |
| RU | 103281 U1 | 4/2011 |
| RU | 2489948 C2 | 8/2013 |
| WO | WO2006082571 A1 | 8/2006 |
| WO | WO-2011146315 A2 | 11/2011 |
| WO | WO-2011146330 A2 | 11/2011 |
| WO | WO2013102612 A2 | 7/2013 |
| WO | WO 2014/017794 | 1/2014 |
| WO | WO2014066730 | 5/2014 |
| WO | WO-2015150759 A1 | 10/2015 |
| WO | WO-2016012795 A1 | 1/2016 |

OTHER PUBLICATIONS

Great Britain Examination Report, Application No. GB1413429.0, dated May 1, 2018, 4 pages.
Russian Decision to Grant, Application No. 2017102047, dated Mar. 20, 2018, 13 pages.
Chinese Office Action, Application No. 201580018258.7, dated May 3, 2018, 8 pages (15 pages with translation).
Russian Decision to Grant, Application No. 2016138630, dated Dec. 21, 2017, 9 pages.
Application and File History for U.S. Appl. No. 15/328,730, filed Jan. 24, 2017, Inventors Nettenstrom et al.
International Preliminary Report on Patentability, Application No. PCT/GB2015/052129, dated Jan. 24, 2017, 7 pages.
International Search Report for corresponding International Application No. PCT/GB2015/050956 dated Jul. 24, 2015, 5 pages.
Application and File History for U.S. Appl. No. 29/503,949, filed Sep. 30, 2014, Inventors: Schennum et al.
Application and File History for U.S. Appl. No. 15/328,099, filed Jan. 23, 2017, Inventors: Schennum et al.
Application and File History for U.S. Appl. No. 15/301,178, filed Sep. 30, 2016, Inventors: Schennum et al.
Written Opinion for corresponding International Application No. PCT/GB2015/050956 dated Jul. 24, 2015, 8 pages.
International Preliminary Report on Patentability for corresponding International Application No. PCT/GB2015/050956 dated Jul. 8, 2016, 16 pages.
Search Report for corresponding GB Application No. 1405721.0 dated Sep. 23, 2014, 5 pages.
EP Notice of Opposition, Application No. 15744297.1, dated Aug. 1, 2019, 100 pages.
Application and File History for U.S. Appl. No. 16/263,362, filed Jan. 31, 2019, Inventors: Schennum et al.
Office Action dated Sep. 3, 2014 for Russian Application No. 2013504605.
Notification of International Preliminary Report on Patentability, Application No. PCT/GB2015/050957, dated Oct. 13, 2016, 9 pages.
Search Report for corresponding GB Application No. 1405719.4 dated Aug. 29, 2014; 4 pages.
International Search Report for corresponding International Application No. PCT/GB2015/050957 dated Jul. 24, 2015; 6 pages.
Written Opinion for corresponding International Application No. PCT/GB2015/050957 dated Jul. 24, 2015; 7 pages.
International Search Report and Written Opinion, International Application No. PCT/GB2015/052129, dated Sep. 7, 2015, 10 pages.
EP Search Report, Application No. GB1413127.7, dated Jan. 22, 2015, 5 pages.
English Translation of Russian Search Report, Application No. 2017101966, dated Jan. 30, 2018, 2 pages.
Chinese Search Report, Application No. 2015800170791, dated May 3, 2018, 2 pages.
European Extended Search Report, Application No. 18199904.6, dated Mar. 13, 2019, 10 pages.
International Preliminary Report on Patentability for corresponding International Application No. PCT/GB2015/050956 dated Jul. 8, 2016; 18 pages.
Application and File History for U.S. Appl. No. 15/301,105, filed Sep. 30, 2016, 473 pages, Inventors: Schennum et al.
Application and File History for U.S. Pat. No. D. 736,460, issued Aug. 11, 2015, inventor: McKeon et al., 234 pages.
Communication pursuant to Article 94(3) EPC for Application No. 18199904.6, dated Apr. 30, 2021, 8 pages.
Decision to Grant dated May 15, 2019 for Russian Application No. 2018117145/12, 11 pages.
Examination Report dated Sep. 27, 2017, for Great Britain Application No. GB1413429.0, 3 pages.
Office Action dated Oct. 19, 2018 for Chinese Application No. 201580041176.4, 5 pages.
Office Action For Chinese Application No. 201910271285.5, dated Oct. 8, 2021, 10 Pages.
Office Action dated May 3, 2018 for Chinese Application No. 2015800170791, 15 pages.
Office Action dated Apr. 5, 2018 for U.S. Appl. No. 15/328,730, 25 pages.
Office Action dated Mar. 6, 2020 for European Application No. EP3171720, 16 pages.
Search Report dated Apr. 24, 2018 for Chinese Application No. 2015800170791, 2 pages.
Examination Report under Section 18(3) for Great Britain Application No. 1413124.7, dated Jul. 30, 2020, 7 pages.

(56) References Cited

OTHER PUBLICATIONS

Office Action for Chinese Application No. 201910271285.5, dated Mar. 30, 2021, 12 pages.
Reply to Appeal for European Patent No. 3171720, mailed on Nov. 29, 2021, 47 pages.
Summons to Attend Oral Proceedings Pursuant to Rule 115(1) EPC for European Application No. 18199904.6, mailed on Mar. 4, 2022, 8 pages.

* cited by examiner

RE-CHARGING PACK FOR AN E-CIGARETTE

RELATED APPLICATION

This application is a continuation of application Ser. No. 15/301,105 filed Sep. 30, 2016, which is a National Phase entry of PCT Application No. PCT/GB2015/050956, filed on Mar. 30, 2016, which claims priority to GB Patent Application No. 1405721.0, filed on Mar. 31, 2014, which are hereby fully incorporated herein by reference.

TECHNICAL FIELD

The present application relates to a re-charging pack for an e-cigarette, such as an electronic vapor provision system or an electronic nicotine delivery system.

BACKGROUND

Electronic vapor provision systems, electronic nicotine delivery systems, etc, which are collectively referred to herein as e-cigarettes, generally contain a reservoir of liquid which is to be vaporized. When a user sucks or draws on the device, this activates a heater to vaporize a small amount of liquid, which is then inhaled by the user. Most e-cigarettes include a re-chargeable battery for supplying electrical power to the heater and other electrical/electronic components, such as a sensor to detect inhalation. Some e-cigarettes have a cartridge section. After the nicotine or other liquid in this cartridge has been exhausted, the empty cartridge can be removed or separated from the e-cigarette and replaced with a new cartridge containing further nicotine.

E-cigarettes are often supplied in packs for protection and easy portability. Such packs may accommodate multiple e-cigarettes and/or replacement cartridges, thereby offering a backup facility if one e-cigarette (or its cartridge) is exhausted. An e-cigarette pack may also have the ability to re-charge an e-cigarette, again helping to ensure good operating availability of the e-cigarette for a user. Typically a pack is provided with a cylindrical hole for receiving an e-cigarette for recharging, the hole generally reflecting the elongated, cylindrical shape of an e-cigarette. When the e-cigarette is located in the hole, the battery can be re-charged by a suitable wired or wireless connection (a wireless connection may rely upon induction charging). In some packs, the cylindrical hole may receive the entire e-cigarette for re-charging, while in other packs only a portion of the e-cigarette may be received into the hole.

In some devices, the pack must be connected to a power supply, e.g. a mains outlet or USB connection, during re-charging of the e-cigarette battery. In this case, the pack is typically acting as a convenient device for holding and interfacing to the e-cigarette during re-charging. In other devices, the pack itself is provided with a battery (or other charge storage facility). The pack battery allows the e-cigarette to be re-charged from the pack without the need for the pack to be connected to an external power supply during the re-charging, thereby providing greater convenience for a user.

The pack battery will of course be depleted in due course, and so is generally provided with its own re-charging facility—typically again reliant upon some form of mains or USB connection. However, since the pack is larger than an e-cigarette, it can accommodate a larger battery and therefore the pack does not have to be re-charged as frequently as an e-cigarette. For example, the charge capacity of a typical e-cigarette battery may be approximately 60 mAh, whereas the charge capacity of a typical pack battery might be in the region of 800 mAh. Accordingly, the pack battery is capable of re-charging the e-cigarette a few times at least before the pack battery itself needs to be re-charged.

Such a multiple or hierarchical arrangement of separately chargeable systems, namely firstly an e-cigarette and secondly a pack for the e-cigarette, is relatively rare. In contrast, most re-chargeable devices, e.g. mobile (cell) phones, are usually connected directly to a mains-powered charging supply (or else to an in-car charging supply). It is desirable for the (re)charging of an e-cigarette and associated pack to be as reliable and convenient for a user as possible.

SUMMARY

Various embodiments provide a pack for holding and re-charging an e-cigarette. The pack comprises a pack battery; a body portion including a tube for receiving an e-cigarette; a re-charging mechanism for re-charging the e-cigarette received into the tube using the pack battery; and a lid attached to the body portion. The lid can be opened to allow the e-cigarette to be received into the tube, and closed to retain the e-cigarette in the tube. The pack is configured to transition from a higher power state to a lower power state a predetermined period of time after the lid is opened and before the lid has been shut.

Various embodiments also provide a method of operating a pack for holding and re-charging an e-cigarette. The pack comprises a pack battery, a body portion including a tube for receiving an e-cigarette, a re-charging mechanism for re-charging the e-cigarette received into said tube using the pack battery, and a lid attached to the body portion. The lid can be opened to allow the e-cigarette to be received into the tube, and closed to retain the e-cigarette in the tube. The method comprises detecting that the lid has been opened; and transitioning the pack from a higher power state to a lower power state a predetermined period of time after the lid was opened and before the lid has been shut.

The present approach is not restricted to specific embodiments such as set out herein, but features from different embodiments may be combined, modified, omitted or replaced by the skilled person according to the circumstances of any given implementation.

BRIEF DESCRIPTION OF THE DRAWINGS

Various embodiments of the disclosure will now be described in detail by way of example only with reference to the following drawings:

FIG. 5 is a perspective view showing the annular light element as fitted into the insert; FIG. 6 is an exploded view showing the annular light element and insert disassembled; and FIG. 7 is a cross-section in a vertical plane through the annular light element as fitted into the insert.

DETAILED DESCRIPTION

Figure 1:
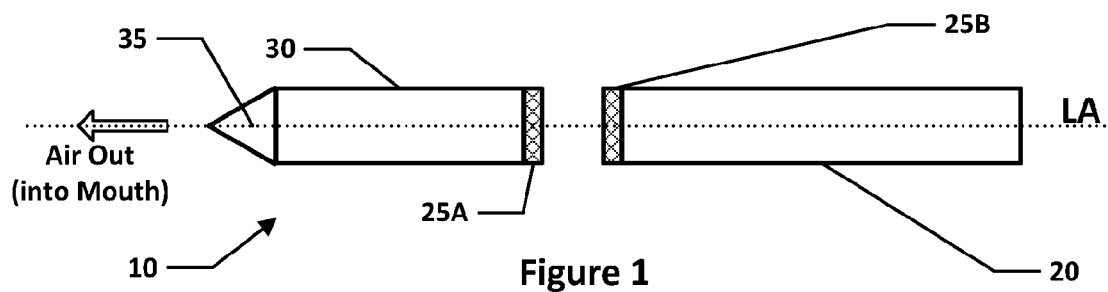
FIG. 1 is a schematic (exploded) diagram of an e-cigarette in accordance with some embodiments of the disclosure.

FIG. 1 is a schematic diagram of an e-cigarette 10 in accordance with some embodiments of the disclosure (not to scale). The e-cigarette 10 has a generally cylindrical shape, extending along a longitudinal axis indicated by dashed line LA, and comprises two main components, namely a body 20 and a cartomizer 30. The cartomizer 30 includes an internal chamber containing a reservoir of nicotine, a vaporizer (such as a heater), and a mouthpiece 35. The reservoir may be a foam matrix or any other structure for retaining the nicotine until such time that it is required to be delivered to the vaporizer. The cartomizer 30 also includes a heater for vaporizing the nicotine and may further include a wick or similar facility to transport a small amount of nicotine from the reservoir to a heating location on or adjacent the heater.

The body 20 includes a re-chargeable cell or battery to provide power to the e-cigarette 10 and a circuit board for generally controlling the e-cigarette 10. When the heater receives power from the battery, as controlled by the circuit board, the heater vaporizes the nicotine and this vapor is then inhaled by a user through the mouthpiece.

The body 20 and cartomizer 30 are detachable from one another by separating along the longitudinal axis LA, as shown in FIG. 1, but are joined together when the device 10 is in use by a connection, indicated schematically in FIG. 1 as 25A and 25B, to provide mechanical and electrical connectivity between the body 20 and the cartomizer 30. The electrical connector on the body 20 that is used to connect to the cartomizer may also serve as a socket for connecting to a charging device (not shown) when the body is detached from the cartomizer 30.

The e-cigarette 10 is provided with one or more holes (not shown in FIG. 1) for air inlet. These holes connect to an air passage through the e-cigarette 10 to the mouthpiece 35. When a user inhales through the mouthpiece 35, air is drawn into this air passage through the one or more air inlet holes, which are suitably located on the outside of the e-cigarette 10. This airflow (or the resulting change in pressure) is detected by a pressure sensor that in turn activates the heater to vaporize the nicotine from the cartridge. The airflow passes through, and combines with, the nicotine vapor, and this combination of airflow and nicotine vapor then passes out of the mouthpiece 35 to be inhaled by a user. The cartomizer 30 may be detached from the body 20 and disposed of when the supply of nicotine is exhausted (and replaced with another cartomizer if so desired).

It will be appreciated that the e-cigarette 10 shown in FIG. 1 is presented by way of example, and various other implementations can be adopted. For example, in some embodiments, the cartomizer 30 is provided as two separable components, namely a cartridge comprising the nicotine reservoir and mouthpiece (which can be replaced when the nicotine from the reservoir is exhausted), and a vaporizer comprising a heater (which is generally retained). In other embodiments, the e-cigarette 10, the body 20 and the cartomizer 30 may be joined together permanently, so in effect they are just a single component. Some such unitary (one-piece) e-cigarettes may allow replenishing of a nicotine reservoir when exhausted using some suitable (re)supply mechanism; other one-piece e-cigarettes may be disposed of once the nicotine reservoir has been exhausted. Note that this latter type of device still generally supports re-charging because the battery will normally become depleted more quickly than the nicotine reservoir. The skilled person will be aware of many further possible designs and implementations of an e-cigarette.

Figure 2:
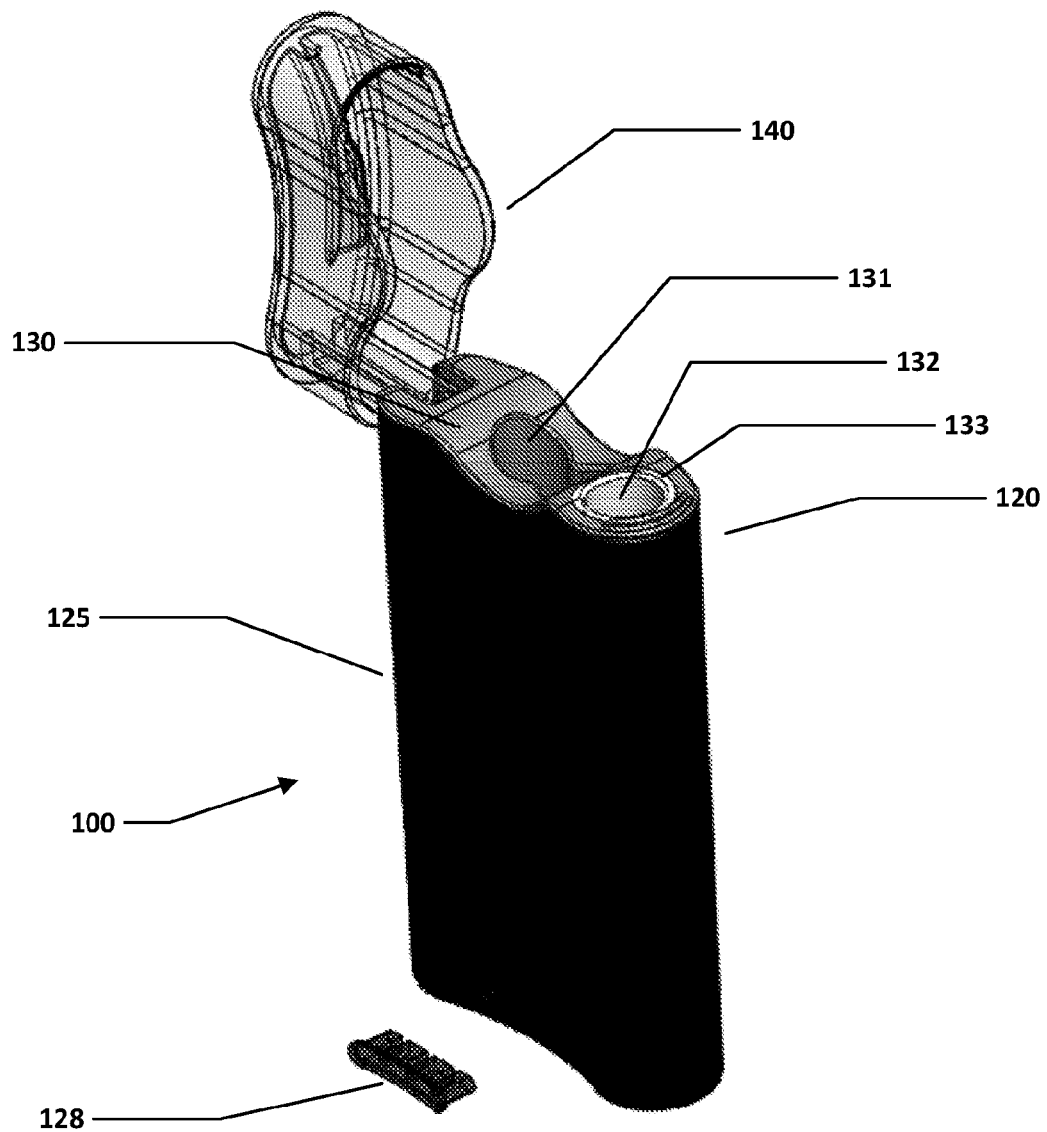
FIG. 2 illustrates a pack 100 for receiving and accommodating an e-cigarette in accordance with some embodiments of the disclosure.

FIG. 2 illustrates a pack 100 for receiving and accommodating an e-cigarette in accordance with some embodiments of the invention. The pack comprises a body 120 which is provided with a hinged lid 140 that can open and close. The body 120 comprises an outer case or housing 125 which is fitted with an insert 130. More particularly, the outer case 125 has an opening at the top, i.e. the end at which the lid is located, and the insert 130 is fitted into, and generally closes, this opening. The insert itself is provided with two openings or holes that extend down into the body 120 of the pack 100. The first opening 132 comprises a substantially circular hole (in terms of cross-sectional shape). The first opening 132 is surrounded by an annular light element 133, as described in more detail below. The second opening 131 in the insert comprises a pair of linked holes (only one of which is easily visible in FIG. 2). The openings 132 and 131 (and more particularly, each of the pair of holes formed by opening 131) can be used to receive an appropriately shaped object, such as an e-cigarette, a spare or used cartridge, etc. The dimensions of pack 100 are generally arranged so that an e-cigarette accommodated within openings 132 or 131 protrudes slightly out of this opening. This allows a user to readily discern the contents of pack 100 (as also helped by making lid 140 transparent), and also facilitates removal by a user of an e-cigarette located within one of these openings.

The pack 100 is further provided with a set of LED lights 128. These are shown separated from the casing 125 in FIG. 2 in an exploded view, but in the assembled pack 100 are integrated into the body 120 so as to lie flush with the outer casing 125. These LED lights 128 can be used to indicate the charging state of the pack 100, for example, whether it is fully charged, partly charged, or fully discharged. The LEDs lights 128 may also be used to indicate whether or not the pack 100 is currently charging (being charged). Such charging may be accomplished via a (mini or micro) USB link using a (mini or micro) USB connector located on the underside of the pack 100 (not visible in FIG. 2).

Figure 3:
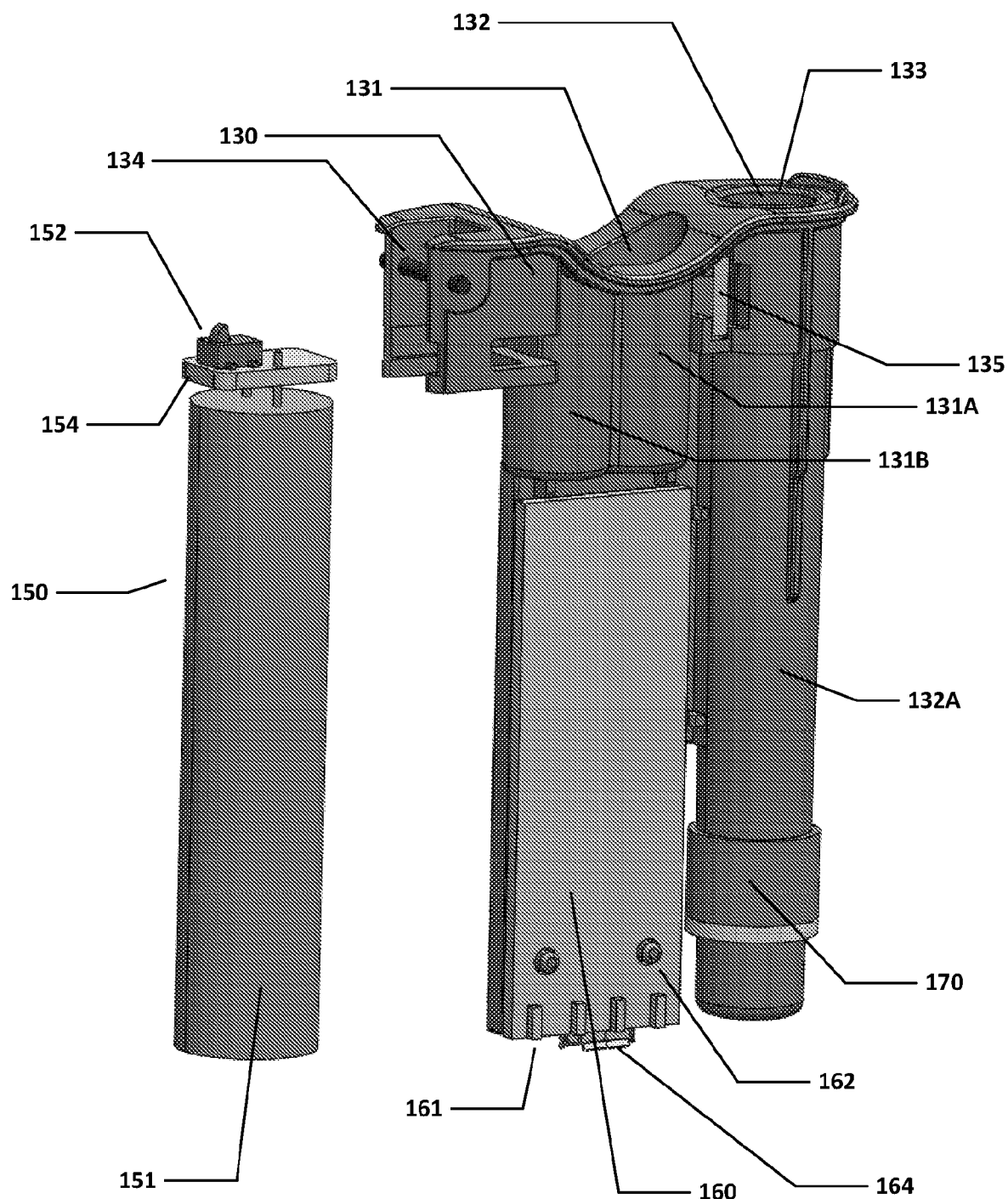
FIG. 3 illustrates the main internal components of the pack of FIG. 2 in accordance with some embodiments of the disclosure.

FIG. 3 illustrates the main components that are housed within the body 120 of the pack 100, more particularly, within housing 125, in accordance with some embodiments of the disclosure (some minor components, such as internal wiring, are omitted for reasons of clarity). The body 120 includes a battery unit 150 comprising a battery 151, a printed circuit board (PCB) 154, and a switch 152. For clarity, the battery unit 150 is shown separated from the insert 130, however, in practice the two are assembled together. The body 120 can be seen to include a hinge or axle 134, which provides a pivot about which the lid 140 is able to open and shut. The battery unit 150, including the switch 152, is located substantially below the hinge 134.

As illustrated in FIG. 3, the insert 130 extends substantially to the bottom of the outer casing 125. The insert defines a substantially cylindrical tube 132A extending down from opening 132, which is able to receive and hold an e-cigarette. The insert further includes two further substantially cylindrical tubes 131A, 131B, which overlap one another, extending down from opening 131 with a "figure-of-8" cross-section. Note that the bottom of tubes 132A, 131A and 131B may be closed by the insert itself 130, or may be open, but abutting against the bottom of the outer casing 125, which would then have the effect of again closing the bottom of the tubes 132A, 131A and 131B in order to retain an e-cigarette (or other item, such as a spare cartridge, therein).

Note that the battery 151 is relatively large—comparable in size, for example, with the opening 132 and associated tube 132A for receiving an e-cigarette. Consequently the battery 151 of the pack 100 will usually have significantly greater electrical storage capacity than a battery provided in an e-cigarette which may be accommodated within the pack. This allows the battery in the e-cigarette to be re-charged, typically several times, using the battery unit 150 of pack 100, without the need for any additional, external power supply (such as a mains connection). This can be very convenient for a user, who may be in a location or situation which does not provide a ready connection to the mains.

In order to support this re-charging of an e-cigarette stored within the pack 100, a portion of the tube 132A is provided with a recharging system comprising a coil 170 which is coaxial with the tube 132A and forms in effect a collar or sleeve around the tube 132A. This tube is used to perform induction charging of an e-cigarette located in the tube 132A. Alternatively, as shown in FIG. 8A, the tube 132A may be provided with a recharging system comprising a suitable electrical contact 171 at its base (or elsewhere) to provide a wired power supply for an e-cigarette (or portion thereof) inserted into the tube 132A. The remaining components in FIG. 8A are the same as in FIG. 8 and hence the description thereof will not be repeated.) For example, in some embodiments, the body portion 20 of e-cigarette 10 such as shown in FIG. 1 might be inserted into tube 132A for re-charging via connector 25B. In such an embodiment, tube 132A may be reduced in length so that some portion of the body 20 protrudes from the top of tube 132A, thereby facilitating easier removal of the body from the tube. In this case, the tube 132A may or may not be able to accommodate a fully assembled e-cigarette (but this can be facilitated by providing increased space (depth) in lid 140).

The insert is provided with two printed circuit boards (PCBs), 135 and 160. The PCB 160 acts as a control system to provide the main control functionality of the pack, as will be described in more detail below, and is attached to tubes 131A, 131B by pegs that extend outwards from the walls of tube 131A, 131B through corresponding holes 162 in the PCB 160, thereby retaining the PCB in the appropriate position relative to the tubes 131A, 131B. A mini-USB (or micro-USB) connector interface 164 also referred to herein as USB connector 164) is provided at the bottom of the PCB 160, and is accessible through a corresponding aperture in the underside of the housing 125 of the pack body 120. This USB connector interface 164 can be used to connect an external power supply 166 (see FIG. 8) to the pack 100 for re-charging the battery 151 (and also any e-cigarette located in hole 132A). The USB connector may also be used, if so desired, for communications with the electronics of the e-cigarette, for example to update software on the PCB 160 and/or to download usage data from the PCB, etc. The PCB 160 is further provided with a set of physical and mechanical connectors 161 for retaining and operating the LED lighting 128. In particular, the PCB 160 controls the LED lighting element 128 to provide an indication to a user about the current charging situation of the pack 100, plus any other suitable information.

The other PCB 135 associated with the insert is located on the outside of re-charging tube 132A, relatively near the top, i.e. closer to the hole or opening 132 for receiving an e-cigarette for re-charging. This PCB 135 incorporates at least one light emitting diode (LED), which is used to illuminate the annular light element 133, as described in more detail below.

It will be appreciated that the configuration and arrangement of the pack and insert shown in FIGS. 2 and 3 are provided by way of example, and the skilled person will be aware of many potential variations—e.g. the number, position, size and/or shape of holes 131, 132 may vary from one embodiment to another, likewise the associated tubes 131A, 131B, 132A. Similarly, the details of the positioning, shape and size of the battery unit 150, PCB 160, and other components will generally vary from one embodiment to another, depending upon the particular circumstances and requirements of any given implementation.

Figure 4:
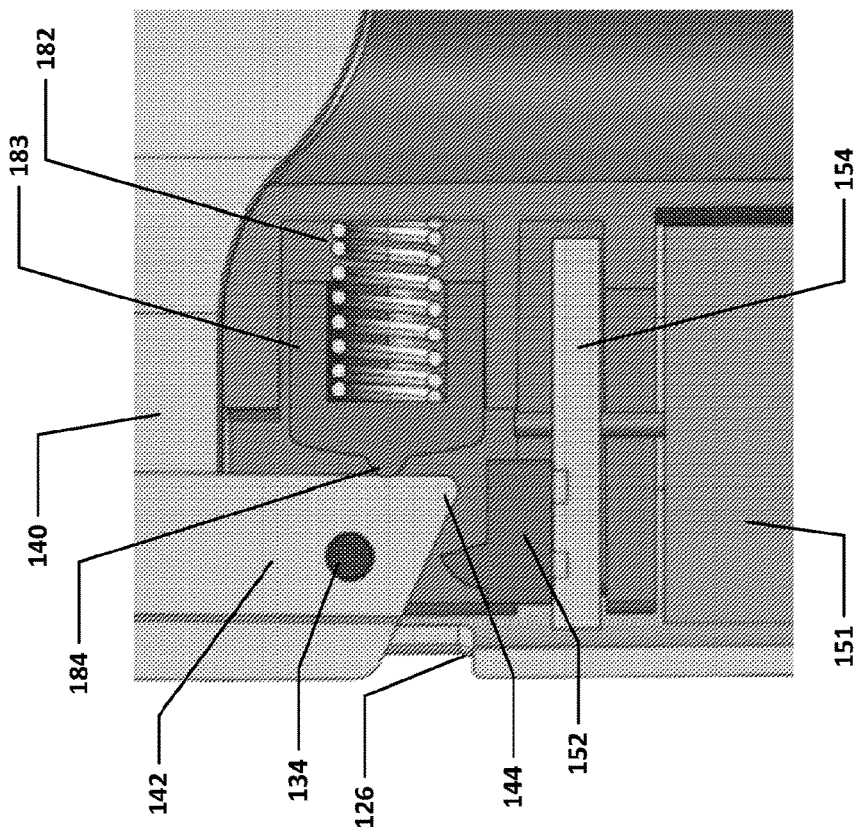
FIG. 4 illustrates a detail of the pack of FIG. 2, especially regarding the operation of the lid, in accordance with some embodiments of the disclosure.

FIG. 4 illustrates a detail of the pack 100 in terms of the operation of the lid 140 as it rotates open and shut about hinge 134. In particular, FIG. 4 comprises a cross-section view through the pack 100 in a vertical plane in accordance with some embodiments of the invention. The insert 130 is provided with a biasing unit comprising a coil spring 182 and a cap 183, the end of which is emphasized by a protruding nipple 184. As the lid 140 is rotated open from the closed position shown in FIG. 4, the lid arm 142 pivots in counter-clockwise fashion about hinge (axle) 134. This rotation causes the arm 142 to push against the cap 183, thereby tending to compress spring 182, which therefore opposes this initial stage of the rotation of the lid. However, once the corner 144 of the arm 142 which is furthest from the hinge 134 has passed the nipple 184 on the cap, further rotation of the lid in an opening direction allows the spring 182 to expand again. In other words, the spring 182 encourages this later stage of rotation (which continues until the arm 142 reaches a mechanical stop, provided by the top rim or ledge 126 of the outer casing 125). This two-stage effect of the spring 182 provides an over-centre biasing mechanism with respect to the opening of the lid 140, in effect driving the lid to one of two favored positions—either fully open or fully shut.

The rotational movement of the lid arm 142 between the open and shut positions also results in a mechanical engagement between the lid arm 142 and the switch 152 attached to the PCB. In particular, opening and closing of the lid activate the switch 152 in opposite directions, thereby allowing the control system of the pack to use the state of switch 152 to determine whether the lid of the pack is open or shut.

Figure 5:
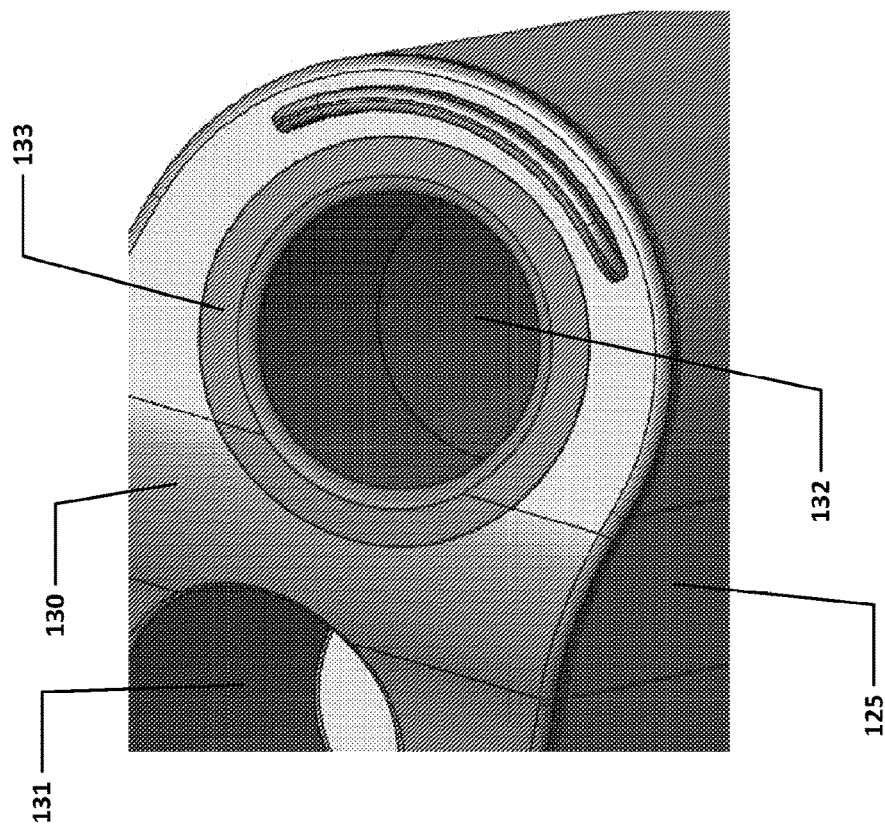
FIGS. 5, 6 and 7 illustrate in more detail the annular light element and the insert from the pack of FIG. 2 in accordance with some embodiments of the disclosure. In particular.
Figure 7:
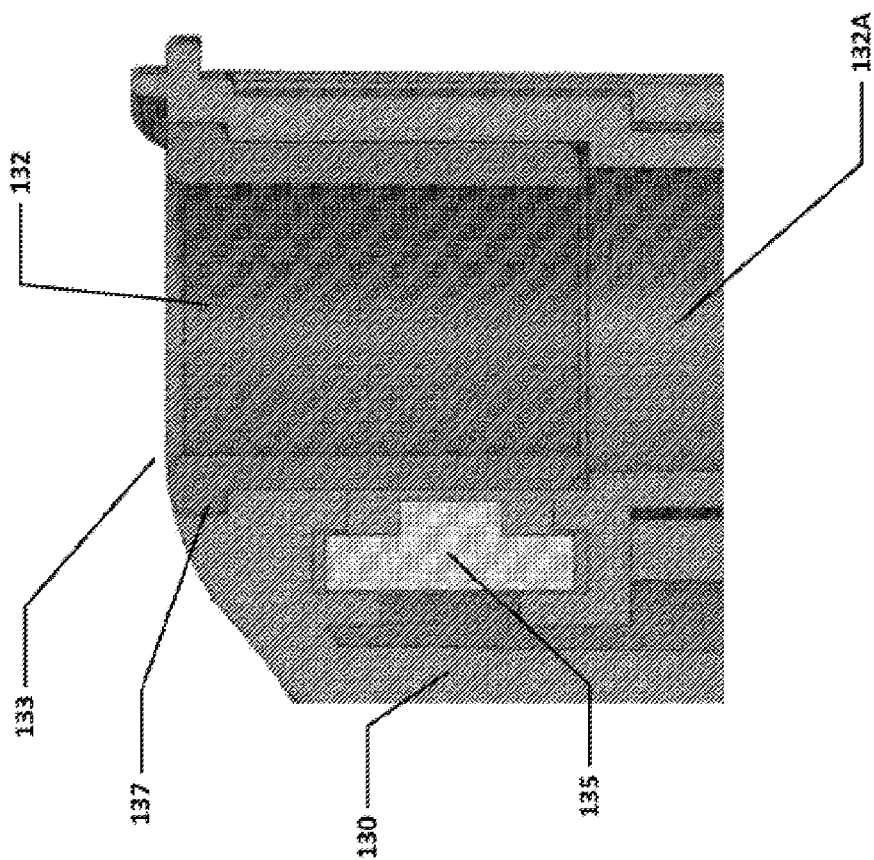
Figure 6:
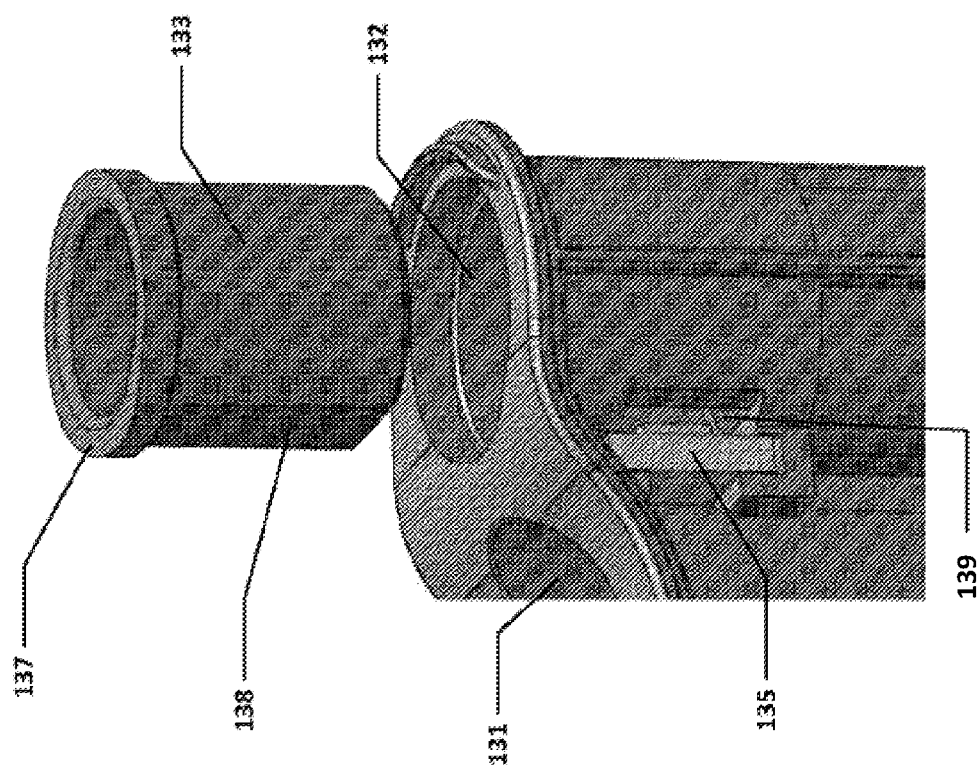

FIGS. 5, 6 and 7 illustrate in more detail the annular light element 133 and its relationship to the insert 130 in accordance with some embodiments of the disclosure. In particular, FIG. 5 is a perspective view showing the annular light element 133 as fitted into the insert 130 (and also outer case 125); FIG. 6 is an exploded view showing the annular light element 133 and insert 130 disassembled; and FIG. 7 is a cross-section in a vertical plane through the annular light element 133 as fitted into the insert 130.

The annular light element 133 is in the shape of a tube or sleeve. The inner surface of this tube comprises a cylinder of circular cross-section and is sized to receive an e-cigarette for storage and/or re-charging. The outer surface of the tube is likewise generally a cylinder of circular cross-section, but has two additional features. The first is a lip or rim 137 directed radially outwards at the top of the annular light element (assuming the normal orientation of pack 100, whereby the lid is at the top, and an e-cigarette 10 would be inserted downwards through opening 132). This lip rests on a corresponding ledge formed at the top of tube 132A, adjacent opening 132, and the lip and ledge cooperate to maintain the annular light element at the correct position within the tube 132A—i.e. so that the annular light element does not disappear further down into the tube 132A. The lip also helps to provide a greater light emitting area, as described in more detail below.

The second additional feature is a flattened or planar surface 138, which in a horizontal plane forms a chord with respect to the otherwise circular outer cross-section of the annular light element. This flattened surface 138 helps to prevent rotation of the angular light element 133 within tube 132A in an azimuthal direction about the axis of tube 132A (which is coaxial with the axis of the annular light element, and also an inserted e-cigarette).

The flattened surface 138 is positioned facing and immediately adjacent to the PCB 135 which incorporates at least one light emitting diode (LED). As noted above, this LED is used to illuminate the annular light element 133. This transfer of light from the LED into the annular light element 133 is facilitated by the flattened surface 138 of the annular light element 133, since it allows a greater surface area of the annular light element 133 to be positioned close to the LED. The light transfer is also facilitated by a slot or aperture 139 which is cut into the wall of the tube 132A (see FIG. 6). In particular, the aperture 139 allows the LED provided by the PCB 135 to protrude into and through the wall of the tube 132A, and hence to lie immediately adjacent the annular light element 133.

The annular light element 133 is formed of a transparent or translucent material which allows light from the LED to spread through the material of the annular light element. This light is able to exit through the top of the annular light element, and hence is visible to a user. It will be appreciated that lip 137 helps to expose a greater surface area of the annular light element 133 for this emission of light, thereby increasing visibility to a user.

The annular light element provides an indication to the user of the charging state of an e-cigarette inserted into the tube 132A. In particular, the PCB 135 is controlled to illuminate the LED according to various predetermined criteria relating to the charging state of the e-cigarette, thereby providing the user with direct visual information relating to this charging state.

Figure 8:
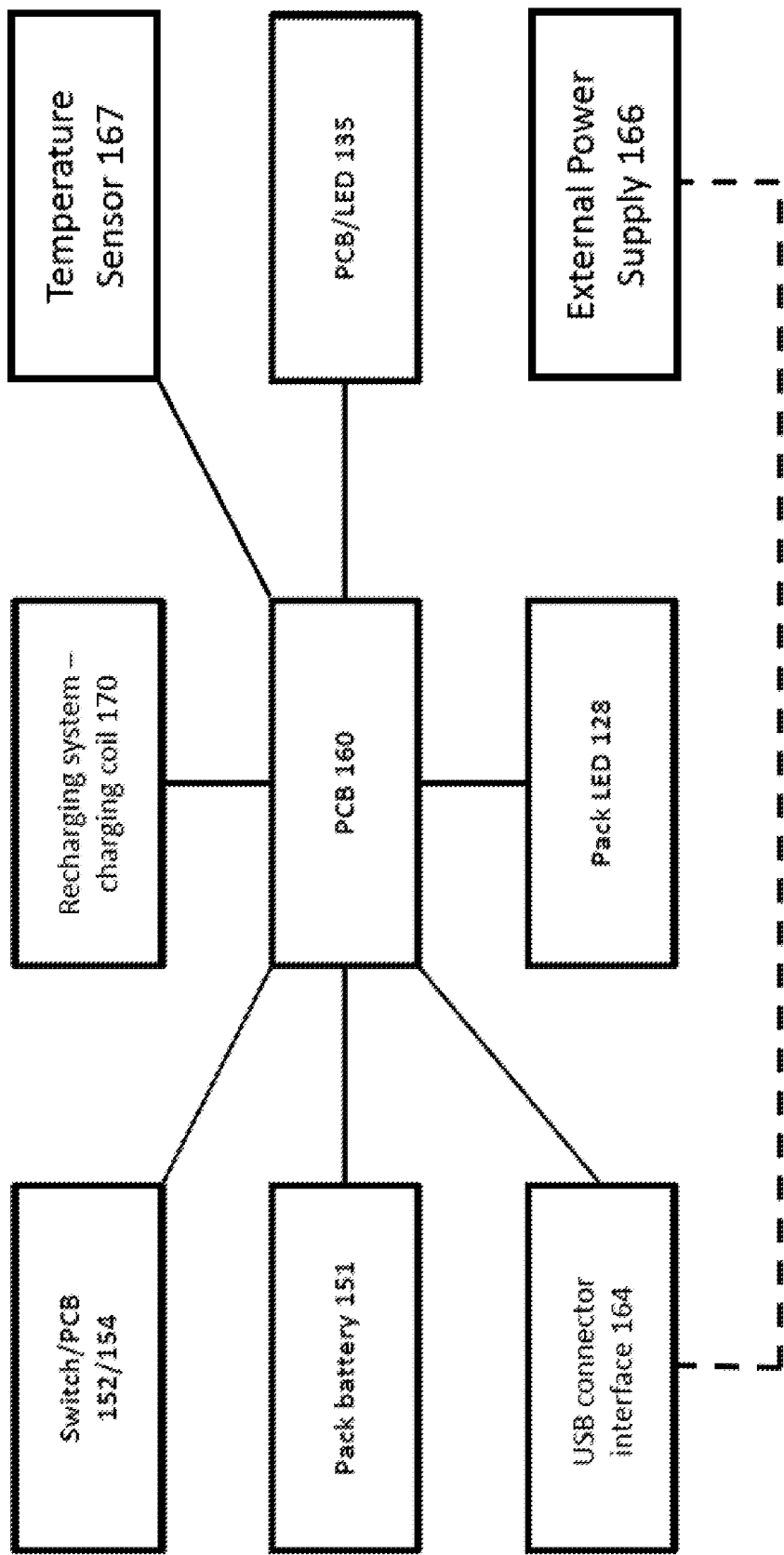
FIG. 8 is a schematic diagram of the electrical/electronic configuration of the pack of FIG. 2 in accordance with some embodiments of the disclosure that use a charging coil for re-charging the e-cigarette.
Figure 8A:
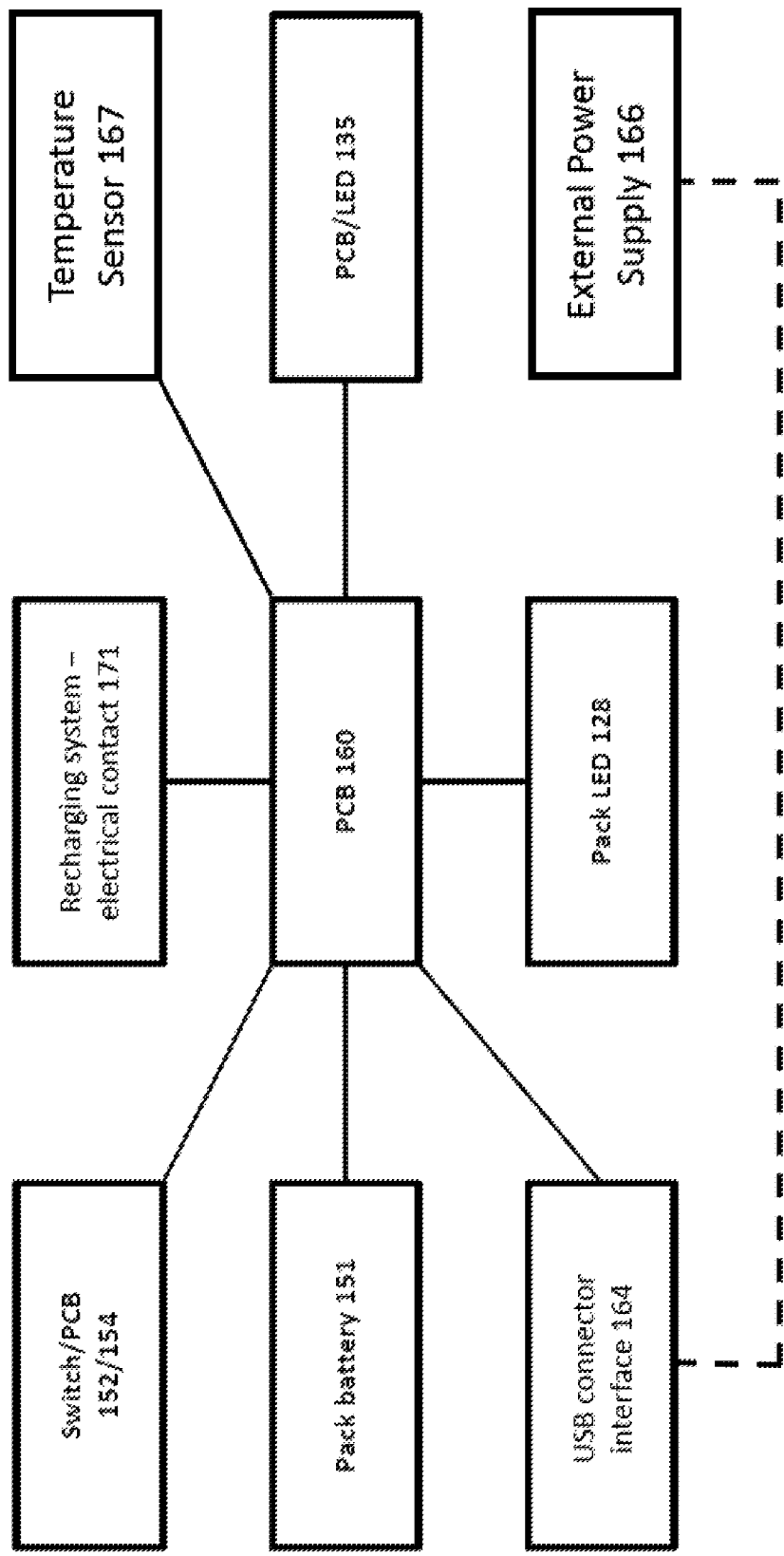
FIG. 8A is a schematic diagram of the electrical/electronic configuration of the pack of FIG. 2 in accordance with some embodiments of the disclosure that use an electrical contact for re-charging the e-cigarette.

FIG. 8 is a schematic diagram of the electrical/electronic configuration of the pack 100. Note that this diagram is primarily concerned with control operation rather than power supply (so, for example, a direct power supply linkage from pack battery 151 to switch/PCB is omitted). FIG. 8 also assumes that the control functionality for the pack resides on the main PCB 160, although some elements of this control functionality may be distributed or off-loaded as appropriate to PCB 154 or PCB 135.

The primary control inputs to the PCB 160, in accordance with some embodiments of the disclosure, are as follows:
 a) external power supply available through USB connector 164 (yes/no). (There may also be additional control information provided by the USB connector, for example, to reset any usage data maintained within PCB 160, but these are not relevant for present purposes.)
 b) level of charge in pack battery 151. The PCB then uses the LED lights 128 of the pack to provide the user with an indication of this charge level.
 c) pack lid 140 open or shut according to switch 152.
 d) presence of an e-cigarette in tube 132A (yes/no).

(It will be appreciated that this set of control inputs is provided by way of example only, and other embodiments may not have all the above control inputs and/or may have additional control inputs.)

With regard to (d), the presence or absence of an e-cigarette can only change when the lid is open, as detected by switch 152 (otherwise an e-cigarette cannot be inserted into or removed from the tube 132A). There are various ways in which such a change can be determined. For example, inserting an e-cigarette will change the effective inductance of the charging coil 170, by virtue of the mutual inductance arising from the corresponding induction charging coil in the e-cigarette, and this change in effective inductance can be detected by the PCB 160 or other sensor. Alternatively, if the pack uses a wired connection for re-charging, then the resistance across and/or current through the wired connection will change upon contact with an e-cigarette. A further possibility is to use some other sensing or communication mechanism, e.g. mechanical, electrical, or optical, to determine the presence or absence of an e-cigarette in tube 132A. For example, the PCB 135 may capture light from LED 135 which is reflected back towards PCB 135, and the amount of such reflected light will vary according to whether or not an e-cigarette is present in tube 135. As another example, the bottom of tube 132A may include a mechanical switch, which is activated when an e-cigarette sits in the tube. The skilled person will be aware of further possible mechanisms for detecting the presence of an e-cigarette in the tube 132A.

The PCB 160 may also be provided with information concerning the level of charge of the battery within the e-cigarette. This information may just be a piece of binary information, namely whether or not the battery is fully charged. Alternatively, the PCB 160 may receive more granular information concerning the level of charge of the battery within the e-cigarette, such as an approximate percentage of the current charge level. As before, there are various ways in which the PCB 160 may be provided with this information (which may potentially different from how the PCB determines the presence (or absence) of an e-cigarette in tube 132A). For example, as the e-cigarette battery becomes more charged, this may increase the effective loading on the charging circuit (wired or wireless), in that the charging has to overcome the opposing voltage of the battery which is being charged (which generally rises with an increasing level of charge). This increase in the effective loading on the charging circuit may be monitored to provide an indication of the charge level of the battery within the e-cigarette. Alternatively, for a wired connection between the pack and the e-cigarette, the voltage level of the battery within the e-cigarette may be applied to a particular contact, and hence is available for direct measurement by the pack. Another possible approach is for the e-cigarette itself to monitor the voltage (and hence charge) level of its battery and then to communicate this information to the re-charging pack—for example, over some data or control line for a wired connection, or over some wireless communication link (e.g. Bluetooth) for wireless (such as induction) charging.

As mentioned above, the annular light element 133 is used to provide an indication to the user of the charging state of an e-cigarette inserted into the tube 132A. The charging state may indicate one or more of the following:

a) whether or not the pack is currently charging the e-cigarette battery (through coil 170 in the embodiment of FIG. 3);
b) whether or not the e-cigarette battery is fully charged;
c) some indication of the level of charge of the e-cigarette (intermediate between empty and full);
d) an error state or cut-off, e.g. because of an excess temperature has been detected in the pack or the e-cigarette.

(It will be appreciated that this set of indications is provided by way of example only, and other embodiments may not provide all the above indications and/or may provide additional indications.)

Regarding (d), the pack and/or the e-cigarette may be provided with one or more suitable temperature sensors 167 (see FIG. 8) to make such a detection of over-heating, and such sensor(s) may supply a further control input to the PCB 160 to flag that the pack or e-cigarette is above a threshold temperature. The skilled person will be aware of various other error states that may arise (and be indicated to a user), for example, the detection of excess charging voltage or current, or a failure to determine whether or not an e-cigarette is present in tube 132A, etc.

In accordance with some embodiments of the disclosure, the PCB 160 controls the PCB 135 and its associated light diode according to the charging conditions specified in Table 1 below. In particular, the CPU 160 detects transitions between the various states, based on the control inputs mentioned above, in order to detect the current state, and then sets the light operation as appropriate for (i.e. corresponding to) the current state.

TABLE 1

State of light signal according to charging state

| State | Light operation |
|---|---|
| No e-cigarette in pack | Off |
| Connected to external power supply (via USB 164) - e-cigarette charging | Pulsed (flashing) |
| Connected to external power supply (via USB 164) - e-cigarette fully charged | On |
| Not connected to external power supply - open lid - e-cigarette charging | Pulsed for 10 seconds - then fades out |
| Not connected to external power supply - open lid - e-cigarette fully charged | On for 10 seconds - then fades out |
| Not connected to external power supply - lid closed | Any existing lighting is faded out |

(Note that Table 1 only relates to functional states of the pack and e-cigarette—it does not include error states such as over-current; these can be indicated or flagged by similar modes of flashing lights, lights on and off, etc as for the functional states.)

The annular lighting element 133 (in combination with the PCB and LED 135) provides the user with an indication of the charging state of an e-cigarette in tube 132A. If no e-cigarette is present in tube 132A, the light (as provided by the PCB/LED 135 and annular lighting element) is off. However, if an e-cigarette is present, and the pack is connected to an external power supply, such as via USB connector 164, then the light has one of two states: (i) flashing or pulsing (intermittently on), to indicate that the battery in the e-cigarette is being charged; and (ii) continuously on to indicate that the battery in the e-cigarette is fully charged.

If an e-cigarette is present, but the pack is not connected to an external power supply, then the behavior is modified in view of the limited power available within the pack battery 151. If the lid is open, then the light is again flashed or pulsed to indicate that the battery in the e-cigarette is partly charged, or is permanently on to indicate that the battery in the e-cigarette is fully charged. However, this illumination of the light (either intermittent or continuous) is only for a first predetermined time period, say 10 seconds, after which the light fades out. This period is long enough to provide a clear indication of the charging status to the user, but no long enough to drain significant power from the pack battery 151. If the lid is closed while the light is illuminated (again either intermittently or continuously), then the light fades out over a predetermined time period, for example, 2 seconds. For example, if the pack is connected to the mains supply (with the lid already closed), the light is illuminated to indicate the charge state of the e-cigarette in tube 132A. If the pack is now disconnected from the mains supply, this light signal is faded out.

Although not explicitly indicated in Table 1, if the pack is not connected to an external power supply, the battery 151 of the pack 100 may be too depleted to re-charge a partly depleted e-cigarette battery. In this case, the light may still be illuminated intermittently to indicate the partly charged status of the e-cigarette (even though there is no active re-charging in progress). However, if the e-cigarette is fully charged, this can be indicated by having the light continuously on, subject to the fading specified in Table 1 according to whether the lid is open or shut—in essence, if the lid is shut, then the fading begins immediately, whereas if the lid is open, the fading is delayed until after expiry of the first predetermined time period. Of course, if the battery 151 of the pack becomes fully deleted and there is no connection to an external power supply, then the light provided by PCB 135 will necessarily be off (because there is nothing to power it). Such a situation, namely the depletion of the pack battery, will be apparent to a user because the pack LEDs 128 will likewise be out (off) as well.

The above scheme of indications allows a user to rapidly determine the current charging state—especially whether the e-cigarette is currently being charged or is now fully charged. For example, if the pack is disconnected from the mains and the lid is closed, the lighting element 133 will be off. When a user opens the pack to access an e-cigarette, the lighting element 133 will be illuminated for the predetermined period of time to allow a user to discern the current charge state of an e-cigarette in tube 132A.

Figure 9:
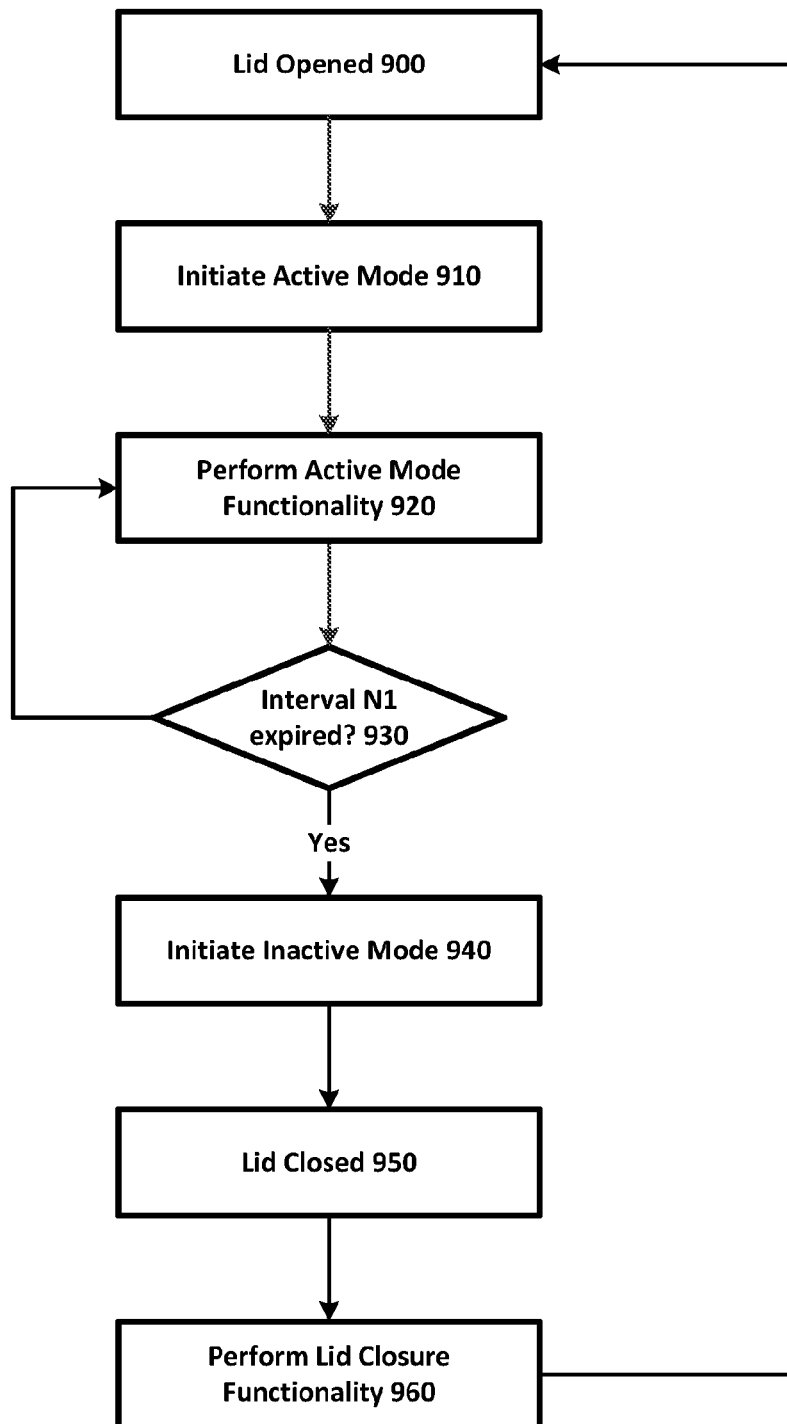
FIG. 9 presents a flowchart showing various operations of the pack in accordance with some embodiments of the disclosure.

FIG. 9 presents a flowchart showing various operations of the pack 100 in accordance with some embodiments of the disclosure. These operations may be generally managed by a control facility on the main PCB 160 (such as a microcontroller or processor). The starting point for the processing of FIG. 9 is assumed to be that the pack is closed. It is now detected that the lid is opened (operation 900) by virtue of the switch 152 and PCB 154 as described above. This detection causes the control facility to initiate an active mode (operation 910) during which various functionality associated with the active mode is performed (operation 920). Some of the functionality which is (or may be) associated with the active mode is described in more detail below. The initiation of the active mode at operation 910 also starts a timer, such as may be provided on the main PCB 160. The system performs the functionality associated with the active mode until this timer expires (operation 930), which is assumed to occur after a time interval of N1.

The expiry of the timer causes the pack to enter an inactive mode (operation 940). As part of this inactive mode, the functionality associated with the active mode is generally terminated or performed at a reduced level. This inactive mode is then maintained until the lid is closed (operation 950), which may be detected again by virtue of the switch 152 and PCB 154 as described above. This causes the pack to perform some functionality associated with the lid closure (operation 960) before returning to the beginning of the processing shown in FIG. 9, namely waiting for the lid to open.

The processing of FIG. 9 helps to conserve power in the battery 151 of the pack 100, in that the active mode terminates after a predetermined time, and the inactive mode is commenced. Although some of the functionality of the active mode may be continued into the inactive mode (potentially at a reduced level), the overall amount of functionality which is performed in the inactive mode is lower than the functionality performed in the active mode. The power consumption in the inactive mode is therefore correspondingly lower than in the active mode.

The timer interval N1 representing the duration of the active mode may be varied according to the particular circumstances. For example, if the battery 151 of the pack is fully charged (or mostly charged), the timer interval N1 may be set to a greater value than when the pack battery 151 has a lower level of charging. In other words, having a lower charge on the battery will result in a shorter active period N1, thereby helping to conserve the (relatively small) remaining amount of battery charge. Another possibility is that if the pack is actively connected to an external power supply (mains/USB), then the active mode may be maintained indefinitely, i.e. N1 is effectively set to infinity. This is because in such a situation there is no need to conserve charge on the battery (because the active mode is being powered by the external power supply, and the battery itself is being re-charged).

There are various pieces of functionality that may be performed as part of the active mode. For example, as described above (see Table 1), the light 133 around opening 132 may be illuminated for a predetermined period (say 10 seconds) after the lid opens to indicate a charging status of an e-cigarette located within opening 132. After this predetermined period, which corresponds to the timer interval N1, the light 133 is faded—i.e. this functionality, which is part of the active mode, is terminated.

Another piece of functionality that may be performed as part of the active mode is the illumination of the LEDs 128. Thus as noted above, these LEDs provide a user with an indication of the charging status of the battery 151 within the pack 100. The LEDs are generally off when the pack lid 140 is closed but are illuminated, as part of the active mode functionality, when the lid is opened at operation 900. As shown in FIG. 2, the pack is provided with multiple LEDs, and the current level of charge of the battery 151 may be indicated by illuminating a corresponding number (proportion) of these LEDs—e.g. having a greater charge in the battery leads to an increased number of LEDs being illuminated. However, after the predetermined period N1 has expired, these LEDs 128 are then faded out, as part of the transition to an inactive mode, in order to conserve battery power.

A further piece of functionality that may be performed as part of the active mode is to detect the presence of an e-cigarette in tube 132A. As noted above, there are various ways in which such a detection can be performed. For example, inserting an e-cigarette will change the effective inductance of the charging coil 170, by virtue of the mutual inductance arising from the corresponding induction charging coil in the e-cigarette, and this change in effective inductance can be detected by the PCB 160 or other sensor. Alternatively, if the pack uses a wired connection for re-charging, then the resistance across and/or current through the wired connection will change upon contact with an e-cigarette, similarly for any capacitance. A further possibility is to use some other sensing or communication mechanism, e.g. mechanical, electrical, or optical, to determine the presence or absence of an e-cigarette in tube 132A.

This detection function (however implemented) may be operational in active mode, but may be discontinued in inactive mode. In other words, if there is no e-cigarette in tube 132A when the lid is open, then the functionality to detect the insert of an e-cigarette into tube 132 may be active for a period of time N1. After this time interval N1 has expired, the detection functionality may be switched off (become inactive). Accordingly, if an e-cigarette is inserted into tube 132A after the time interval N1, this may not be detected by the control facility. Consequently, the control facility may not start charging the e-cigarette from the battery pack 151 and/or may not illuminate the light 133 to indicate the charging status of the e-cigarette (as described above).

In some cases the detection functionality may be operational in the inactive mode, but in a reduced manner. For example, during active mode the detection functionality may make a repeated check to determine the presence of an e-cigarette in tube 132A, for example at a time interval N2 (where N2 is typically >>N1). On the other hand, during inactive mode the detection functionality may make a repeated check to determine the presence of an e-cigarette in tube 132A at a time interval N3 (where N3>N2).

The processing may be somewhat different if an e-cigarette is initially present in the tube 132A when the pack 100 is opened, in which case the detection functionality aims to determine when the e-cigarette has been removed from tube 132A. If the e-cigarette is being charged from the battery pack 151 while it is in tube 132A, it may be desirable for the detection functionality to remain operational during this period, so it can switch off the charging facility upon removal of the e-cigarette. Accordingly, the pack may remain in active mode while the charging is still in progress or alternatively the detection functionality may continue to be operational when the pack goes into inactive mode (when the e-cigarette is initially present at operation 900). It will be appreciated that in any case, the amount of power taken to remain in active mode or to maintain the detection facility in operation will normally be lower than the power taken to recharge an e-cigarette in tube 132A.

If the pack does not contain an e-cigarette on lid opening (at operation 900), and then goes into inactive mode without an e-cigarette being inserted, then an insertion occurring after the expiry of the interval N1 may be detected at operation 960, as part of the functionality performed on lid closure. This is an appropriate timing for performing such a detection, since the pack closure represents a positive (and perhaps conclusory) action by the user, which may be linked to some other action (such as inserting an e-cigarette into the pack). In addition, it will be appreciated that an e-cigarette cannot be inserted into the pack once the lid has been closed, so that trying to detect an inserted e-cigarette at this stage represents a final, one-off check. If an e-cigarette is detected at this stage (as part of the functionality of operation 960), then this may trigger one or more additional actions of the control facility, for example, initiating charging of the e-cigarette from the pack battery 151 if appropriate. On the other hand, if it is confirmed that no e-cigarette is present at this stage, then tube 132A will remain empty at least until the lid is opened, which returns to operation 900 (and the subsequent processing as described above).

FIG. 9 shows the lid being closed (operation 950) after the time interval N1 has elapsed (at operation 930) since the lid was opened (operation 900)—thereby including the transition from active mode to inactive mode. However, a user may of course sometimes close the lid before the expiry of the time interval N1. In these circumstances the pack does not transition from active mode to inactive mode, but rather would go straight, in effect, from operation 920 to operation 950 in FIG. 9. In this case, some or all of the lid closure functionality of operation 960 may be unnecessary, because there was no time spent in the inactive mode to cover for. On the other hand, the lid closure functionality of operation 960 may still be performed, even if potentially redundant, by way of a safeguard or double-check (such as to whether the pack now contains an e-cigarette).

Although in the particular example of Table 1 above, N1 equals 10 seconds, it will be appreciated that there are many other possibilities. For example, N1 may lie in the range of 2 second to 2 minutes, or the range of 4 seconds to 1 minute, or of 5 to 30 seconds, or of 5 to 20 seconds, or of 8 to 15 seconds. In addition, in some implementations the value of N1 may vary according to the particular piece of functionality. Thus one piece of functionality may be active for a first value of N1 (say N1*a*), while another piece of functionality may be active for a second, different value of N1 (say N1*b*, where N1*b* does not equal N1*a*). In this case the transition from active mode to inactive mode is staggered for the different pieces of functionality. This may be helpful if some of the functionality in active mode consumes more power and/or is less important than other functionality (whereby it may be desirable to retain the latter functionality in an active state for longer than the former functionality). Also, the transition from active mode to inactive mode does not have to be sharp, but may be gradual—for example, as per the gradual fading of light 133 after the lid has been open for 10 seconds, as described above.

As described herein, a pack is provided for holding and re-charging an e-cigarette. Such an e-cigarette may comprise an electronic vapor provision system (the vapor may or may not be nicotine), an electronic nicotine delivery system, etc. The pack includes a pack battery and a body portion including a tube for receiving an e-cigarette. The pack further includes a re-charging mechanism for re-charging the e-cigarette received into the tube using the pack battery (which is typically significantly larger than any battery included in the e-cigarette). The re-charging mechanism may utilize a wired or wireless connection to the e-cigarette. The pack further includes a lid attached to the body portion. The lid can be opened to allow the e-cigarette to be received into the tube, and closed to retain the e-cigarette in the tube. The pack is configured to transition from a higher power state to a lower power state a predetermined period of time after the lid is opened (and while the lid is still open). The lower power state draws less power from the pack battery than the higher power state, and thereby helps to conserve charge in the pack battery.

On the other hand, in some cases, if the pack is connected to an external power source (such as a USB connector or the mains), the transition from a higher power state to a lower power state may not occur. This is because it is generally not necessary to conserve battery power in such circumstances (since the pack battery itself is being recharged).

The pack may include a switch (electrical or mechanical) which is activated by the lid opening and closing. The predetermined period of time commences when the switch is activated by the lid opening and the transition to a lower power state occurs after the predetermined time period has expired, assuming that the lid remains open.

The pack may include lights for indicating the charge status of the pack battery and/or the e-cigarette. These lights may be illuminated when the lid is opened, but are then switched off after the predetermined period as part of the transition from a higher power state to a lower power state to conserve power.

The pack may include a mechanism for detecting whether an e-cigarette is located in the tube. The detection mechanism is activated when the lid is opened, and then de-activated as part of the transition from a higher power state to a lower power state if an e-cigarette has not been inserted into the tube during the predetermined time period. In other words, if an e-cigarette is inserted into the tube, this will be detected by the pack if the predetermined time period has not yet expired, but will not be detected by the pack if the predetermined time period has now expired (because the detection mechanism is no longer activated).

Note that the detection of the e-cigarette inserted into the tube may trigger additional actions, for example, illumination of a light to indicate the charge status of the inserted e-cigarette. However, if the e-cigarette is inserted into the tube after the predetermined period has expired, and hence no detection is made, then such additional actions, e.g. illumination of a charge status light, will therefore not occur. A similar situation may occur, for example, in relation to the re-charging mechanism, which may not start re-charging an e-cigarette which is inserted into the tube after the detection mechanism has been de-activated as part of the transition from a higher power state to a lower power state.

In some embodiments, the mechanism for detecting whether an e-cigarette has been inserted into the tube may be re-activated when the lid is closed. This will generally be a short (temporary) re-activation to make a final check on whether an e-cigarette is located in the tube in the pack. If such a detection is positive, the pack may initiate some further processing, such as beginning to re-charge the e-cigarette from the pack battery. On the other hand, some other functionality might not be utilized—e.g. lights to indicate a charging status of the e-cigarette might not now be illuminated, since the closed lid of the pack may indicate that the pack is being put away, e.g. into a bag.

Although certain pieces of functionality have been described herein which switch off or reduce upon the transition from active mode to inactive mode, the skilled person will be aware of various other pieces of functionality which may make a similar transition. For example, the pack and/or e-cigarette may have some communication facility (e.g. Bluetooth) which can turn off or hibernate upon entering inactive mode.

In conclusion, this disclosure shows by way of illustration various embodiments in which that which is claimed may be practiced. The advantages and features of the disclosure are of a representative sample of embodiments only, and are not exhaustive and/or exclusive. They are presented only to assist in understanding and to teach that which is claimed. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc other than those specifically described herein. The disclosure may include other inventions not presently claimed, but which may be claimed in future.

The invention claimed is:

1. A pack for holding and re-charging an e-cigarette, the pack comprising:
   a pack battery;
   a body portion;
   a tube for receiving the e-cigarette, wherein the tube is sized to receive a single e-cigarette;
   a connector interface for re-charging the pack battery from an external power supply; and
   a lid attached to the body portion, wherein the lid can be opened to allow the e-cigarette to be received into the tube, and closed to retain the e-cigarette in the tube; and
   a re-charging system for re-charging the e-cigarette received into the tube using the pack battery, the re-charging system comprising one of a coil which is coaxial with the tube such that the coil forms a collar or sleeve around the tube to perform induction charging of the e-cigarette, or an electrical contact at a base of the tube, the base configured to close off an end of the tube, to provide a wired power supply for the e-cigarette or a portion thereof inserted into the tube, wherein the electrical contact forms a wired connection between the pack and the e-cigarette or the portion thereof inserted into the tube.

2. The pack of claim 1, wherein the tube can accommodate a fully assembled e-cigarette.

3. The pack of claim 1, further comprising a switch which is activated by the lid opening or closing.

4. The pack of claim 1, wherein the pack includes one or more lights for indicating a charge status of the pack battery.

5. The pack of claim 4, wherein the pack is configured to illuminate the one or more lights to indicate the charge status of the pack battery when the lid is opened.

6. The pack of claim 1, wherein the pack includes at least one light for indicating a charge status of an e-cigarette contained in the tube.

7. The pack of claim 6, wherein the pack is configured to illuminate the at least one light to indicate the charge status of the e-cigarette when the lid is opened.

8. The pack of claim 6, wherein the charge status is used to indicate a level of charge of the e-cigarette intermediate between empty and full.

9. The pack of claim 6, wherein the charge status is used to indicate whether or not the e-cigarette battery is fully charged.

10. The pack of claim 6, wherein the charge status is used to indicate whether or not the pack is currently charging the e-cigarette battery.

11. The pack of claim 6, wherein the charge status is used to indicate an error condition.

12. The pack of claim 1, wherein the pack is configured to determine a charge status of the pack battery by monitoring an effective loading on a charging circuit of the re-charging system.

13. The pack of claim 1, wherein the pack is configured to determine a charge status of the pack battery by receiving a communication from the e-cigarette.

14. The pack of claim 13 wherein the communication is provided over a data or control line for a wired connection.

15. The pack of claim 13, wherein the communication is provided over a wireless communication link.

16. The pack of claim 1, further comprising a temperature sensor for measuring temperature and a control system for detecting over-heating of the pack or the e-cigarette if a temperature measured by the temperature sensor is above a threshold temperature.

17. The pack of claim 1, wherein the pack is configured to detect whether an e-cigarette is located in the tube.

18. The pack of claim 17, wherein the pack is configured to re-charge the e-cigarette upon detecting that the e-cigarette is located in the tube and the lid is closed.

* * * * *